United States Patent
Osipchuk et al.

(10) Patent No.: US 6,555,802 B2
(45) Date of Patent: Apr. 29, 2003

(54) SCANNING MICROSCOPE

(75) Inventors: Yuri Osipchuk, Foster City, CA (US); Alexander Dromaretsky, Irvine, CA (US)

(73) Assignee: Axon Instruments, Inc., Union City, CA (US)

( * ) Notice: Subject to any disclaimer, the term of this patent is extended or adjusted under 35 U.S.C. 154(b) by 17 days.

(21) Appl. No.: 09/755,725

(22) Filed: Jan. 5, 2001

(65) Prior Publication Data

US 2001/0048082 A1 Dec. 6, 2001

Related U.S. Application Data

(60) Provisional application No. 60/175,081, filed on Jan. 7, 2000.

(51) Int. Cl.[7] .............................................. G02B 26/00
(52) U.S. Cl. .................................... 250/201.3; 250/234
(58) Field of Search ............................ 250/201.3, 234, 250/458.1, 236, 201.2, 201.4, 201.5, 235; 359/359, 379, 380, 381, 368

(56) References Cited

U.S. PATENT DOCUMENTS

| 3,517,980 A | 6/1970 | Petran et al. |
| 4,758,727 A | 7/1988 | Tomei et al. |
| 4,863,252 A | 9/1989 | McCarthy et al. |
| 4,900,934 A | 2/1990 | Peeters et al. |
| 5,029,955 A | 7/1991 | Chu |

(List continued on next page.)

OTHER PUBLICATIONS

Jean Montagu and Nathan Weiner "Fluorescence Array Scanner Employing a Flying Objective" Journal of the Association for Laboratory Automation v4#1 (Mar. 1999) pp. 40–43.

(List continued on next page.)

Primary Examiner—Robert H. Kim
Assistant Examiner—Hoon K. Song
(74) Attorney, Agent, or Firm—Birdwell, Janke & Durando, PLC (57) ABSTRACT

A scanning microscope. An objective lens receives light emitted from a sample in object space and propagates it to image space thereof. A collection lens receives light from the objective lens and propagates it to a focal point in image space of the collection lens. A motor has an axis of rotation that is offset from and extends in substantially the same direction as the optical axis. The motor rotates the objective lens about the axis of rotation to scan across a sample in object space of said objective lens. The sample is mounted on a stage. After each rotation of the objective lens, the stage is advanced in a radial direction with respect to the axis of rotation so that each subsequent scan covers a new part of the sample. For fluorescence microscopy, a laser light source is provided. A wavelength-selective beamsplitter directs the laser light toward the objective lens, while allowing fluorescence or reflected light emitted from the sample to pass through to the collection lens. A photo detector is placed at the image space focal point of the collection lens so as to convert the intensity of the light emitted from the sample at the focal point of the objective lens in object space to an electrical signal. To achieve high resolution, a light-path-altering optical element is inserted between the light source and the objective lens so as to translate the light centered on the axis of rotation to light centered on the optical axis of the objective lens, thereby filling the entrance pupil of the objective lens.

27 Claims, 5 Drawing Sheets

U.S. PATENT DOCUMENTS

| | | | |
|---|---|---|---|
| 5,459,325 A | | 10/1995 | Hueton et al. |
| 5,724,171 A | | 3/1998 | Amos et al. |
| 5,780,857 A | | 7/1998 | Harju et al. |
| 5,866,911 A | | 2/1999 | Baer |
| 5,880,465 A | * | 3/1999 | Boettner et al. ............ 250/234 |
| 5,910,940 A | * | 6/1999 | Guerra ................. 369/112.24 |
| 5,936,324 A | | 8/1999 | Montagu |
| 5,995,283 A | | 11/1999 | Anderson et al. |
| 6,028,306 A | | 2/2000 | Hayashi |
| 6,072,625 A | * | 6/2000 | Kitahara et al. ............ 250/236 |
| 6,108,127 A | | 8/2000 | Atkinson |
| 6,133,986 A | | 10/2000 | Johnson |
| 6,248,988 B1 | * | 6/2001 | Krantz .................... 250/201.3 |

OTHER PUBLICATIONS

Axon Instruments, Inc. GenePix 4000 Series Microarray Scanner see http://www.axon.com/GN_Genomics.htnl International Application No. PCT/US99/06097 entitled Wide Field of View and High Speed Scanning Microsopy, International Filing Date Mar. 19, 1999, published under the Patent Cooperation Treaty (International Publication No. WO 99/47964, published Sep. 23, 1999).

* cited by examiner

SCANNING MICROSCOPE

This application claims the benefit of the inventors' provisional application, Ser. No. 60/175,081, filed Jan. 7, 2000, incorporated herein by reference in its entirety.

FIELD OF THE INVENTION

This invention relates to microscopy, and particularly to scanning microscopes for confocal fluorescence microscopy.

BACKGROUND OF THE INVENTION

In fluorescence microscopy, a sample to be examined is treated with one or more dyes that selectively attach to parts of the sample and, when illuminated with excitation light of one wavelength, fluoresce at light of another, emission wavelength. The fluorescent light is examined microscopically to identify the parts of the sample to which the dyes have attached. Typically, in modem fluorescence microscopy, the illumination is provided with a laser, which provides relatively intense light over a narrow spectrum to excite particular dyes selectively.

It is advantageous in fluorescence microscopy to use a scanning microscope that images only one point or pixel of the sample at a time. Where the image is to be digitized for computerized enhancement or analysis, this permits descritization of the sample by use of a relatively simple detector and relatively simple optics. Also, scanning microscopy makes confocal microscopy possible, which provides higher resolution than would otherwise be available. As discussed hereafter, scanning microscopy may be accomplished either by moving the scanning spot using a fixed objective lens, by moving the optical system itself, or by moving the sample.

An early approach to scanning microscopy is illustrated in Petran et al. U.S. Pat. No. 3,517,980, which discloses the use of a fixed, extended light source focused on a Nipkow disc, having spiral apertures, which produces a point source of light that scans the object field of a fixed microscope objective. The light emitted from the sample is focused on a complementary aperture in the disc and thereafter propagated to an eyepiece to effectuate confocal microscopy. A similar approach is disclosed in McCarthy et al. U.S. Pat. No. 4, 863,252, which is directed to producing relative movement of the optics and sample stage for selecting the region and depth of the sample to be scanned.

More recently, scanning microscopes have employed a fixed point source and fixed objective, and cause the illumination light and the light emitted from the specimen to be scanned. For example, Hayashi U.S. Pat. No. 6,028,306 discloses a scanning microscope wherein the beams produced by a plurality of point sources are caused to scan in two dimensions by pivoting mirrors operated by galvanometers. More generally, Atkinson U.S. Pat. No. 6,108,127 describes the use of scanning optics to alter the path of a light beam through a fixed microscope objective.

The aforementioned types of scanning microscopes require highly corrected and expensive lenses to achieve high resolution and sensitivity. They also require complex and expensive optical systems mechanical scanning devices.

Another recent approach to scanning microscopy is illustrated by Boettner et al. U.S. Pat. No. 5,880,465, wherein the microscope objective itself is translated laterally in two orthogonal directions to scan the sample by moving the focal point of the objective. While this approach provides the advantage of reducing the effect of off-axis light beams by ensuring that the light emitted from the specimen is always on axis, the use of linear translation to cover the entire region to be scanned limits both the area that can be scanned and the speed at which scanning can occur, and can work only with low mass objectives which have limited optical performance.

Accordingly, there is a need for a scanning microscope that provides high resolution, high sensitivity and high scanning speed using relatively straightforward and inexpensive, but high performance, optics and mechanics.

SUMMARY OF THE INVENTION

The invention of the present application meets the aforementioned need by providing a scanning microscope that employs a combination of rotational and linear scanning to permit the use of a relatively simple optical elements and a relatively simple mechanical scanning system. In its general form the microscope comprises an objective lens for receiving light emitted from a sample in object space and propagating it to image space thereof, a collection lens that receives light from the objective lens and propagates it to a focal point in image space of the collection lens, and a motor, having an axis of rotation that is offset from and extending in substantially the same direction as the optical axis of the objective lens, for rotating the objective lens around the axis of rotation. This causes an optical pathway to be scanned across a sample in object space of the objective lens.

The sample is mounted on a stage. After each rotation of the objective lens, the stage and the optics are moved relative to one another with respect to the axis of rotation so that each subsequent scan covers a new part of the sample. Thus, the entire sample may be scanned. The stage and the optics may be moved relative to one another in another lateral direction as well, to move another sample, or sample portion, under the scanning area.

For fluorescence microscopy, a light source, typically a laser, is provided. A wavelength-selective beamsplitter directs the laser light toward the objective lens, while allowing fluorescence or reflected light emitted from the sample to pass through to the collection lens.

A photo detector is placed at the focal point of the collection lens in image space so as to convert the intensity of the light emitted from the sample at the focal point of the objective lens in object space to an electrical signal. Preferably, an aperture is placed at the image space focal point of the collection lens so as to provide confocal microscopy. Additional detectors may be used, combined with corresponding wavelength-sensitive beamsplitters to tap light from the collection lens, for measuring the intensity of various wavelengths of fluorescence light produced by excitation of the sample.

To achieve high resolution, the maximum numerical aperture of the objective lens may be used. A light-path-altering optical element is inserted between the light source and the objective lens so as to translate the light centered on the axis of rotation to light centered on the optical axis of the objective lens, thereby filling the entrance pupil of the objective lens despite rotation thereof.

Where the objective lens is fixed, a rotating light-path-altering optical element receives light from an off-objective-optical-axis point in object space of said objective lens and directs it along the objective optical axis, and vice versa.

Accordingly, it is a principal object of the present invention to provide a novel and improved scanning microscope and scanning microscopy method.

It is another object of the invention to provide a scanning microscope that achieves high resolution and sensitivity with relatively straightforward optics.

It is a further object of the invention to provide a scanning microscope that achieves high resolution and sensitivity with a relatively straightforward scanning mechanism.

It is yet another object of the invention to provide a relatively high speed scanning microscope.

The foregoing and other objects, features, and advantages of the invention will be more readily understood upon consideration of the following detailed description of the invention, taken in conjunction with the accompanying drawings.

DETAILED DESCRIPTION OF THE INVENTION

Figure 1:
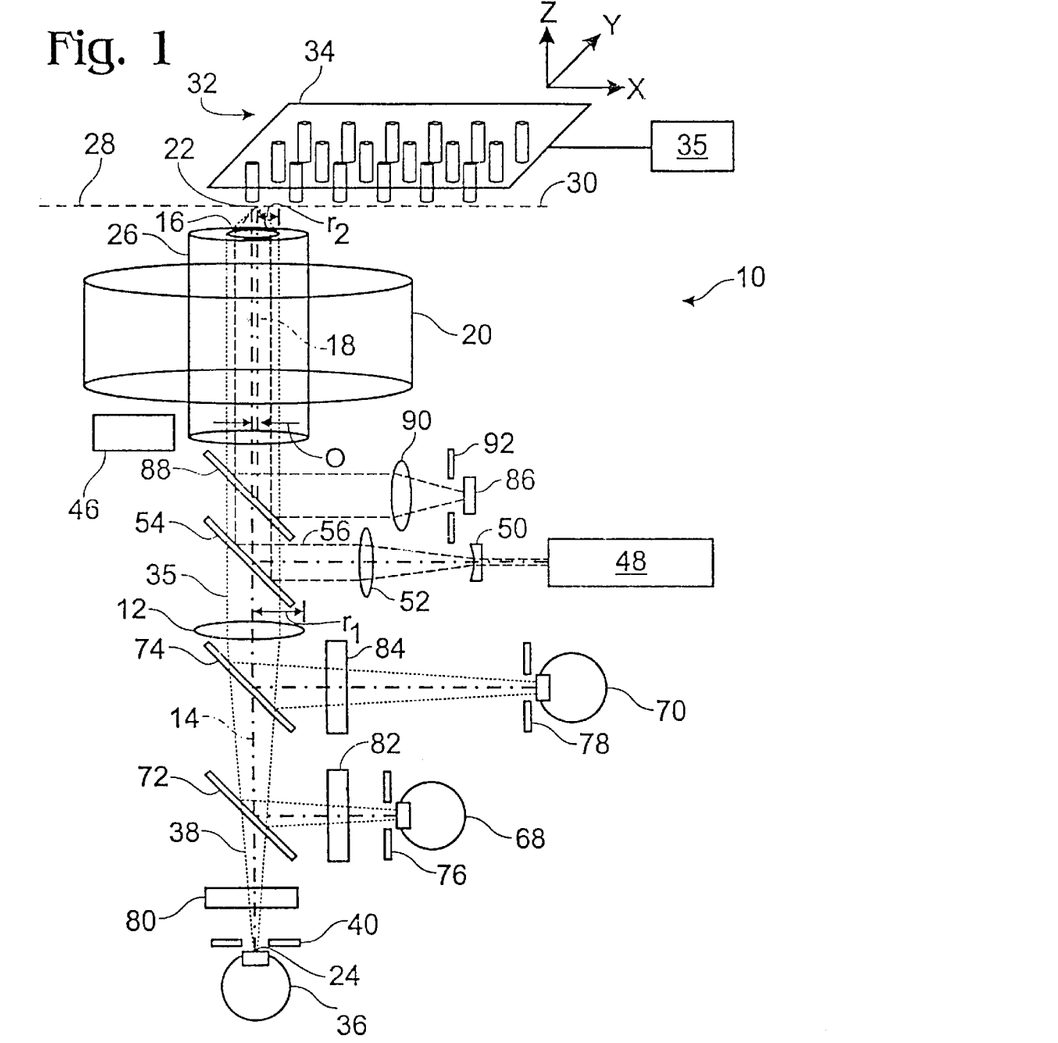
FIG. 1 is a schematic diagram of a scanning microscope according to the present invention.

Referring to FIG. 1, a basic scanning microscope 10 according to the invention comprises a collection lens 12, having a collection optical axis 14, an objective lens 16, having an objective optical axis 18, and a motor 20, having an axis of rotation. The motor rotates the objective lens 16 around the axis of rotation of the motor. Preferably, the motor 20 is a hollow shaft motor, that is, a motor whose windings are disposed around a rotating hollow shaft 26 that houses the objective lens 16. In the embodiment of FIG. 1, the axis of rotation is coincident with the collection axis 14; however, that is not necessary for the invention. The objective axis 18 is offset from and extends in substantially the same direction as the axis of rotation of the motor by offset "O." Light originating at the object-space focal point 22 of the lens system comprising the combination of the collection lens 12 and objective lens 16 will be focused at the focal point 24 in the image space of that system.

In the embodiment of FIG. 1, the offset O is less than the sum of the radius $r_1$ of the collection lens and the radius $r_2$ of the objective lens so as to prevent full vignetting of the light.

As the objective lens rotates in a circle, it scans a sample placed at the object space focal plane 30 of the lens system. Points in the sample located at the moving focal point 22 of the system are imaged to the fixed focal point 24 of the system. In fluorescence microscopy, the samples typically are arranged in an array 32 placed on a movable stage 34, having a positioning motor 35 which can position the samples in the x, y and z dimensions, as is commonly understood in the art. It is to be understood, however, that other types of samples could be employed with the scanning microscope without departing from the principles of the invention.

Preferably, the portions of the samples 32 to be imaged are placed in the object-space focal plane of the objective lens 16 so that light emitted from the samples produces a collimated beam 35, and is focused at the image-space focal point of the collection lens 12. In this preferred case, the object-space focal point of the lens system is the same as the object-space focal point of the objective lens 16 and the image-space focal point of the lens system is the same as the image-space focal point of the collection lens 12. However, it is to be recognized that different conjugate focal planes and points may be used without departing from the principles of the invention.

Ordinarily, a first photo detector 36, such as a photo multiplier tube, is placed at the system image space focal point 24 so as to convert the intensity of the focused light beam 38 from the sample into an electrical signal, as is commonly understood in the art. Preferably, an aperture 40 is provided at the focal point 24 so as to block off-axis light and thereby create a confocal microscope. However, it is to be understood that, in its most general case, the invention does not require these elements.

Figure 2:
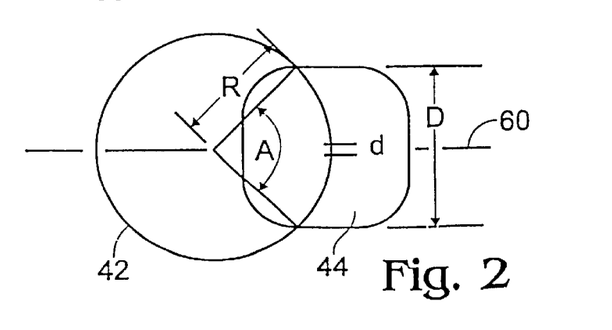
FIG. 2 is a diagram showing the scanning path of the scanning microscope of FIG. 1 in relation to a typical sample to be scanned.

In FIG. 2, the path which the focal point 22 follows as the objective lens is rotated is represented by circle 42 of radius R. The sample 44 is positioned by the stage 34 so that an arc, represented by angle "A," is traced by the focal point 22 over the sample 44. As the objective lens 16 is rotated, the stage 34 moves the sample 44 inwardly or outwardly along radial axis 60 so that, with each successive rotation of the objective lens, a new portion of the sample 44 is scanned over the arc represented by angle A. In this way, the entire sample can be scanned.

Since the scanning is arcuate, the composite image data is "warped." Accordingly, a computer program is provided to convert the data obtained to a standard orthogonal image of the sample, as will be understood by persons of ordinary skill in the art. This is known as "unwarping" the image. Denoting the width of the sample by "D", the angle A of the arc is:

$$A = 2 \cdot arc\ sin(D/(2R))$$

The duty cycle, that is, the ratio of the time required for one scanning arc to the time of one complete revolution of the objective lens 16, is:

$$duty\ cycle = 2 \cdot arc\ sin(D/(2R))/360$$

For a typical sample width of D=1.3 mm and a scan radius of R=0.8 mm, the full angle of the arc is 108.7° and the duty cycle is approximately 30%. Denoting the time for one complete revolution of the objective lens as "T" and the pixel width as "d," the pixel dwell time "t" is:

$$t=(Td)/(2\pi R).$$

For example, if T=4 milliseconds (15,000 RPM to obtain 2000 scan arcs in 8 seconds), then t=0.557 microseconds, so the pixel sampling frequency is 1.8 megahertz. Such a sampling frequency is readily available in practice.

Returning to FIG. 1, the scanning microscope is preferably equipped with a rotary encoder 46 which provides a signal indicative of the angular position of the shaft 26 of the motor, which is used to synchronize the angular position of the lens disposed in the shaft with the acquired scan data. The speed of rotation of the motor may be made accurate and stable, preferably using a DC brushless motor, because of the inertia of its rotor. Sensing the angular position of the shaft permits identification of the beginning of the sampling area, which is used to synchronize a pixel clock for acquisition of data from the optical detector. A simple index sensor is adequate for most applications, though a high resolution rotary encoder can provide more accurate position sensing.

In fluorescence microscopy, a light source is provided to excite the sample to emit light that is collected by the microscope. In scanning fluorescence microscopy, the scanning mechanism may be used to focus the excitation light on the sample, as well as collect the emitted fluorescent light from the sample. In another aspect of the present invention, excitation light is provided by a laser 48, ordinarily used with beam-expanding optics comprising, for example, a biconcave lens 50 and a bi-convex lens 52. A beam splitter 54, ordinarily a dichroic mirror, is centered on the collection axis 14 for reflecting the expanded laser beam 56 along and centered about the collection axis 14 through the center of the hollow shaft 26 toward the objective lens 16 so as to be focused at focal point 22. The diameter of the beam may be slightly smaller than the diameter of the pupil of the objective lens, since it would otherwise be vignetted due to the offset "O." Alternatively, the diameter of the beam may be larger than the diameter of the pupil of the objective lens, but that impairs microscope sensitivity.

Fluorescent light emitted by the sample as a result of excitation by the laser beam will have a different, ordinarily longer, wavelength from that of the laser beam light. It will be propagated from the focal point 22 toward the focal point 24 of the system, and will pass through the beam splitter 54, which reflects the excitation light beam 56 but passes the fluorescent light beam 35, as is understood by persons skilled in the art.

Figure 3:
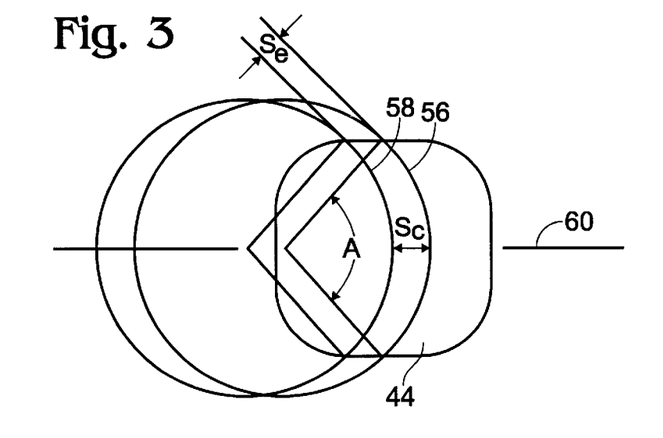
FIG. 3 is a diagram showing two adjacent scans of the sample shown in FIG. 2.

FIG. 3 illustrates the relationship between two neighboring arcs 56 and 58 which are traced sequentially across sample 44 as the sample moves radially outward and the objective lens 16 is rotated. Since scanning of the sample is a combination of linear scanning along axis 60 and arcuate scanning, the distance between two neighboring arcs is different at the center of the arcs, where the arcs cross the radial axis 60, and their edges, where the arcs leave the sample 44. Denoting the separation at the center as "$s_c$," the separation "$s_e$" at the edges is:

$$s_e=s_c\cdot\cos(A/2)$$

This results in some overlapping of illuminated spots of neighboring arcs at the edges of the sample, and somewhat greater exposure of the sample to excitation light at the edges of the sample than at the center. The amount of exposure is inversely proportional to the distance between the arcs, that is:

$$\text{exposure}\sim 1/\cos(A/2)$$

For example, if A=108.7 degrees, the edges are exposed about 70% more than the center. This excess exposure may result in bleaching of the sample at the edges, which may produce inaccurate results, depending on the properties of the sample and the intensity of the excitation light. This excess exposure can be reduced by increasing the diameter of the arc, that is, by increasing the offset O between the objective axis and the collection axis, at the cost of increased duty cycle. Thus, it is possible to trade off the duty cycle and the uniformity of the sample bleaching by the excitation light.

Figure 4:
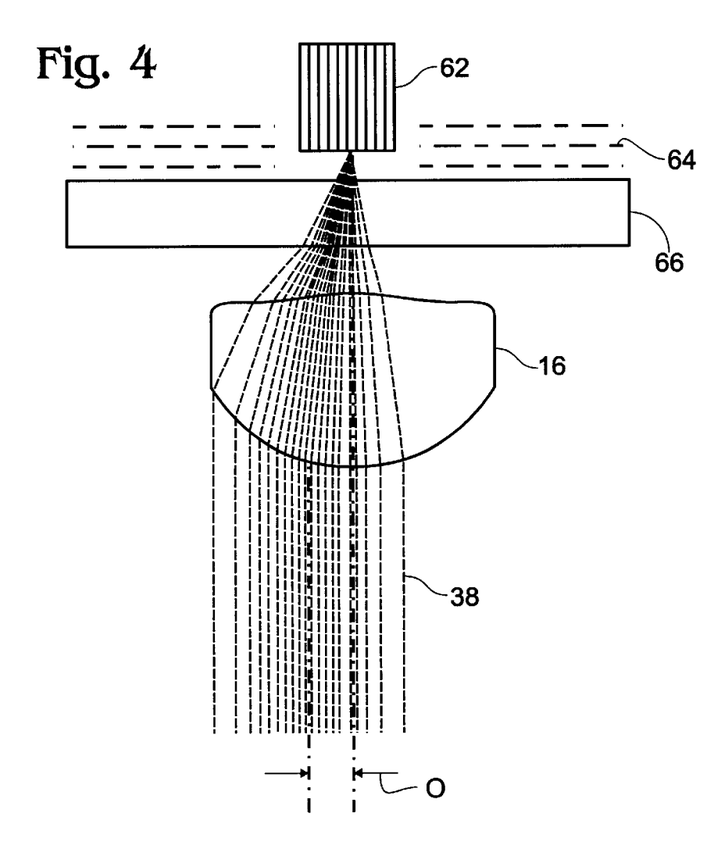
FIG. 4 is a two-dimensional representation of an aspheric lens for use in the scanning microscope of FIG. 1, according to the invention, together with a typical application of the microscope.

Preferably, the objective lens 16 is an aspheric, aberration-corrected lens. Referring to FIG. 4, a typical application of the scanning microscope of the present invention is for examining samples 62, disposed in a water solution 64, and supported by a plastic well 66 through which the lens system must image the sample. It has been found that, under these circumstances, with 1.2 mm thick plastic, 0.5 mm of water solution separating the plastic well from the samples, and an offset O=0.8 mm, a simple aspheric lens can provide adequate image quality.

Returning again to FIG. 1, the excitation light from the laser may cause fluorescence at several different wavelengths, depending on the dyes that are used. Where more than one wavelength is of interest, additional photo detectors 68 and 70, such as photo multiplier tubes, and additional beam splitters 72 and 74, preferably dichroic mirrors, and apertures 76 and 78 may be used. Preferably, the photo detectors 36, 68 and 70 also have emission, or barrier, filters 80, 82 and 84 in front of them to reject excitation light that has been reflected or scattered by the sample or the optics.

Also in the case of fluorescence microscopy, an optional additional photo detector 86, preferably a photodiode, is provided in combination with a slightly reflecting beam-splitting mirror 88, a focusing lens 90, and an aperture 92 in front of the photo detector 86, to detect excitation light reflected or scattered from the sample for autofocusing the microscope. The position of the specimen is adjusted in the Z direction by the stage 34 until the signal from the detector 86 is maximized, which happens when the specimen is in the focal plane of the objective lens 16. This can be done every time a new sample is put in the microscope, or continuously, as needed.

Figures 5, 6:
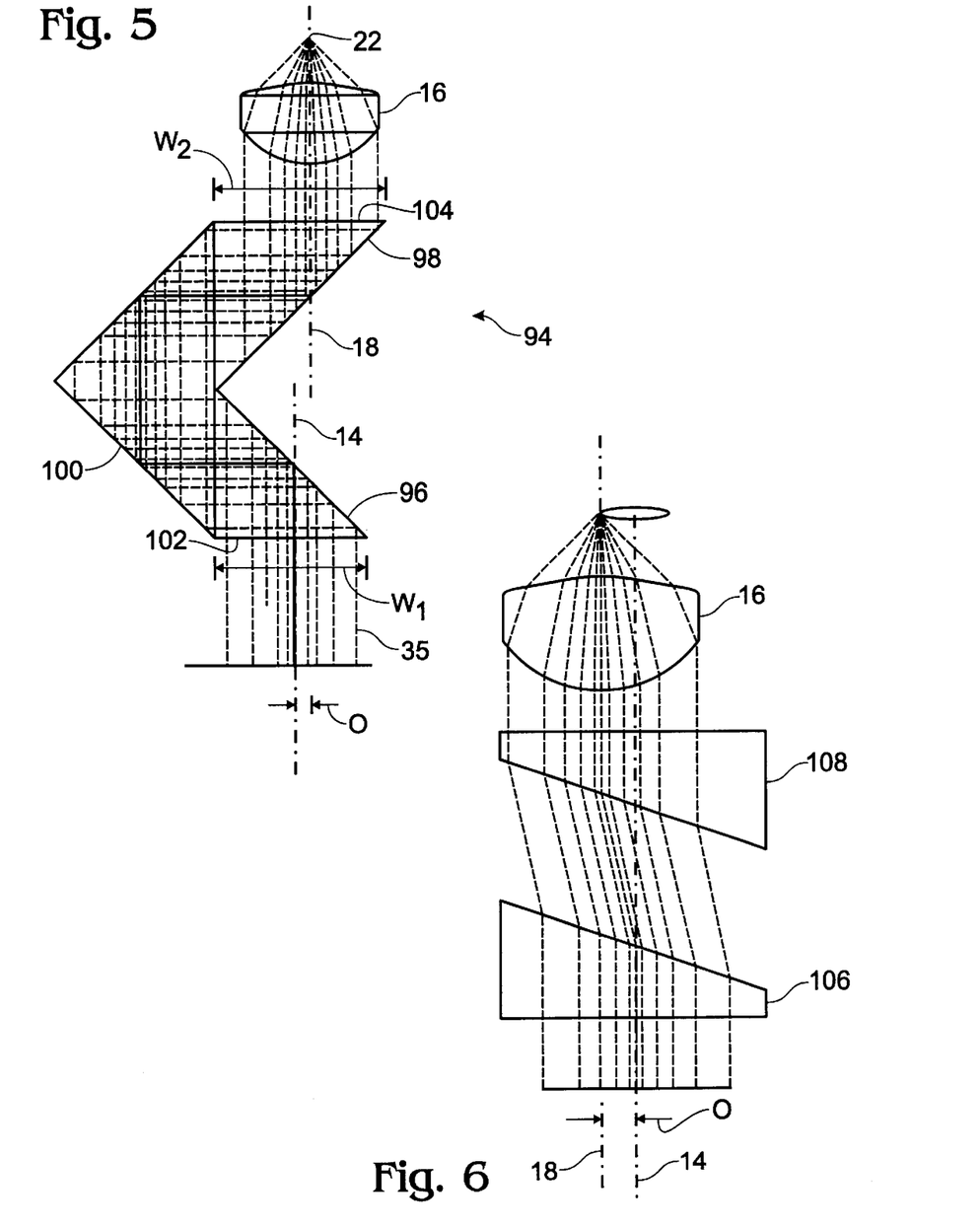
FIG. 5 is a two-dimensional representation of a prism system for use in a first alternative embodiment of a scanning microscope according to the present invention.
FIG. 6 is a two-dimensional representation of a wedge system for use in a second alternative embodiment of a scanning microscope according to the present invention.

In a first alternative embodiment of the invention, the diameter of the illumination beam is made equal to the diameter of the objective lens pupil. To fill the pupil of the objective lens with the beam, a system 94 of mirrors or prisms is used, as shown in FIG. 5. Preferably, the system is made of three cemented right angle prisms 96, 98 and 100 of different sizes. Prism 100 couples light between prisms 96 and 98. The prism system 94 is preferably disposed within the hollow shaft 26 of the motor 20 so as to rotate therewith. Prism 96 has a principal face 102 whose width "$W_1$" is smaller than the width "$W_2$" of principal face 104 of prism 98 by an amount equal to the offset O, so that light is translated from the collection axis 14 to the objective axis and vice-versa. Alternatively, an equivalent light path can be created by a system of four mirrors, as will be appreciated by a person skilled in the art.

In a second alternative embodiment, wedge prisms 106 and 108 are used to offset the objective axis, while filling the entrance pupil of the objective lens with the excitation light beam. Prism 106 deflects the excitation light beam, forcing it off the collection axis, while prism 108 "straightens" the beam, directing it parallel to the objective axis, with an offset, as shown in FIG. 6.

Figure 7:
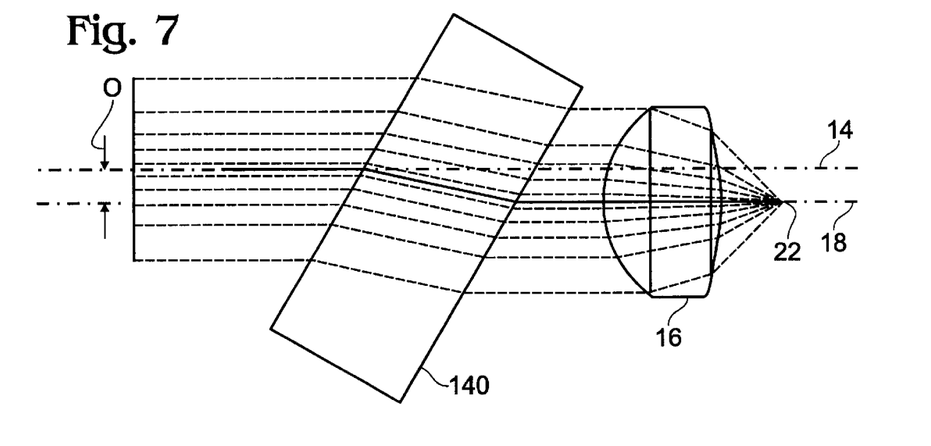
FIG. 7 is a two-dimensional representation of a plane-parallel plate and objective lens for use in a third alternatively embodiment of a scanning microscope according to the present invention.

In a third alternative embodiment of the invention, a plane-parallel plate 140 of glass or other transparent material, as shown in FIG. 7, is placed at an angle between the objective lens 16 and the rest of the optical system shown in FIG. 1. The plate 140 displaces the light from the collection axis to the objective axis. The plate is mounted to the hollow shaft 26, so that it rotates together with the shaft and objective lens 16, causing the beam of excitation light to fill the lens entrance pupil independently of the angular position of the shaft. As in the aforedescribed first and second alternative embodiments, the plate 140 also directs the fluorescent or reflected light from the sample, collected by the objective lens 16, to the rest of the optical system.

Figure 8:
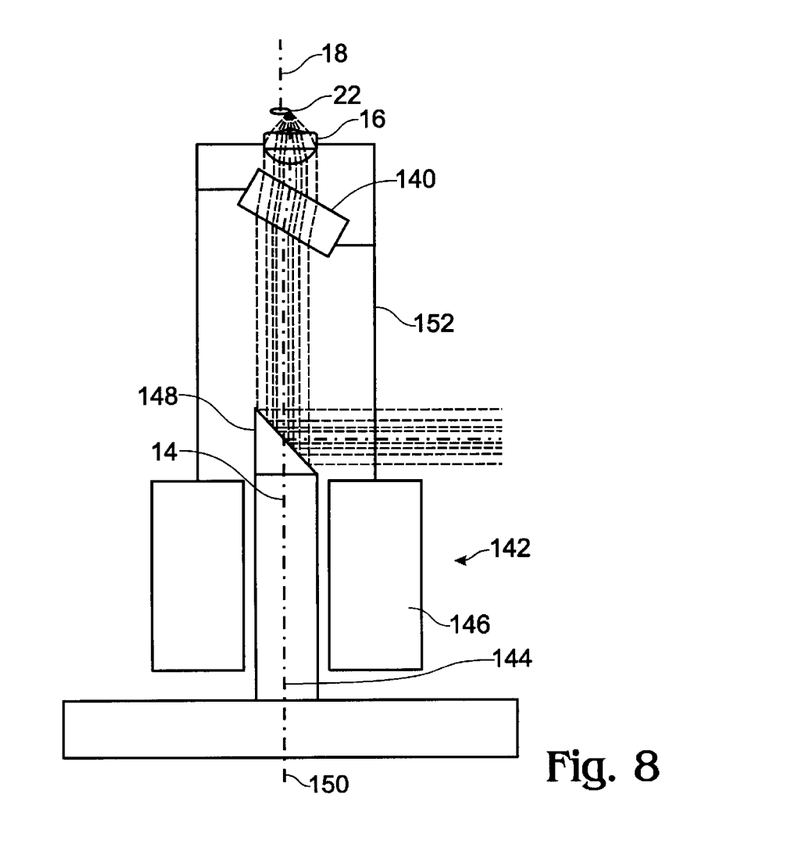
FIG. 8 is a diagrammatic side section of a fourth embodiment of a scanning microscope according to the present invention.

In a fourth alternative embodiment of the invention, shown in FIG. 8, a motor 142 with a fixed shaft 144 and an outside rotor 146 is used instead of the motor with a hollow shaft as described in the aforementioned embodiments. A folding mirror 148 is mounted on the fixed shaft 144 so as to reflect the excitation beam toward the objective lens 16 and to reflect the fluorescent or reflected light emitted by the sample back toward the rest of the optical system, which is located to the side of the axis of rotation 150 of the motor. The outside rotor 146 is mechanically coupled to the objective lens 16 and, preferably, to a plane parallel plate 140 as described above, by a linkage 152 so as to rotate the lens 16 and plate 140. However, this embodiment may be used without the plane parallel plate, or any substitute therefor, or with one of the devices shown in FIGS. 5, 6 or 10, described hereafter, instead of the plane parallel plate.

Figure 9:
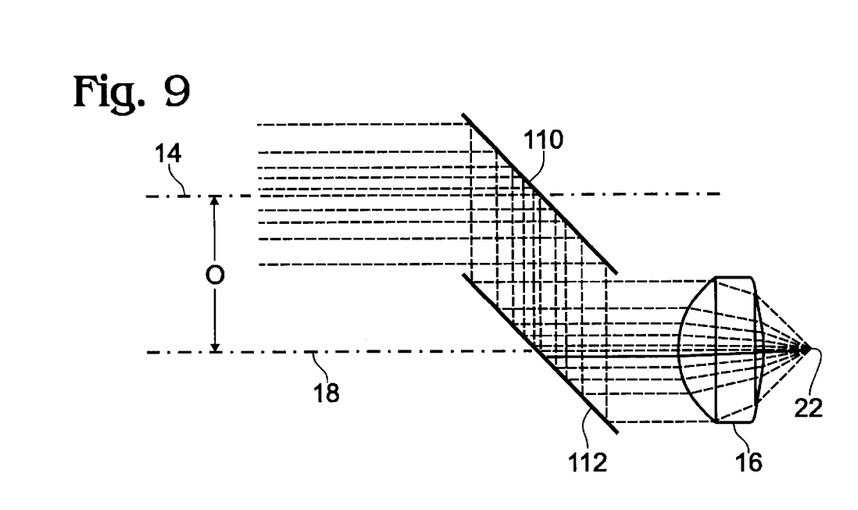
FIG. 9 is a two-dimensional representation of a mirror system for use in a fifth alternative embodiment of a scanning microscope according to the present invention.

In a fifth alternative embodiment of the invention a spinning lens, shown in FIG. 9, is used to image an object which may be larger than the lens itself. In this case a simple periscope system of mirrors 110 and 112 is used to offset the objective axis from the collection axis by a distance larger than the radius of the objective lens.

Figure 10:
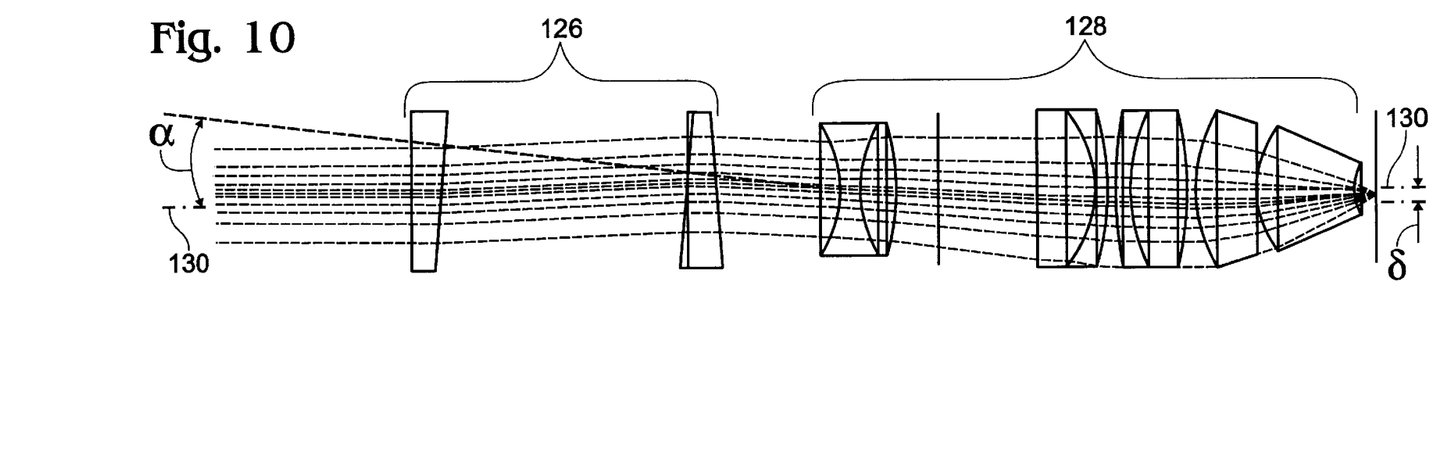
FIG. 10 is a two-dimensional representation of a system of wedge prisms and objective lens for use in a sixth alternative embodiment of a scanning microscope according to the present invention.

In a sixth alternative embodiment of the invention, a system 126 of wedge prisms, or mirrors, is used to direct the illumination beam to the entrance pupil of the objective lens system 128 at some angle "α," as shown in FIG. 10. The illumination light is focused by the objective lens 16 at a spot on the sample some distance from the optical axis 130 of the objective lens system. The distance "δ" is determined by the focal length "F" of the objective lens and the angle α:

$$\delta = F \cdot \tan(\alpha).$$

The objective lens system 128 is stationary, but the system 126 of wedge prisms rotates around the optical axis of the objective lens system. In this case, the optical axis 130 of the objective lens system 128 is the same as the optical axis of the collection lens and the axis of rotation of the wedge prisms.

As the prisms rotate, the spot moves in a circle around the single optical axis 130. The fluorescent, or reflected, light from the spot is collected by the objective lens system and after passing back through the wedge prisms and the dichroic mirrors, as shown in FIG. 1, is detected by the light detectors and so on, acquiring data from the arc on the sample. The sample is then moved and another arc is scanned and so on, until the whole sample is scanned, similarly to the first embodiment. An advantage of this embodiment is that the objective lens system is not spinning, so it may be used closer to the sample, potentially allowing use of the immersion objectives with high numerical apertures. A disadvantage is that a simple aspheric lens is not adequate, as the lens is not working along its optical axis, and aberrations become an issue. Consequently, an aberration-corrected lens system 130 must be used as the objective. Still, the objective lens system could be much simpler than those used in standard confocal scanning microscopes, as it only needs to provide good imaging at a fixed angle of the incoming beam.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A scanning microscope, comprising:
   a collection lens, having a collection optical axis, for receiving light in object space thereof and propagating it to a focal point on said collection optical axis in image space of said collection lens;
   an objective lens, disposed in object space of said collection lens and having an objective optical axis, for receiving light emitted from a sample in object space of said objective lens and propagating it to said collection lens; and
   a motor, mechanically-coupled to said objective lens and having an axis of rotation offset from and extending in substantially the same direction as said objective optical axis, for rotating said objective lens in one direction around said axis of rotation so as to scan across a sample in object space of said objective lens and propagate light emitted from the sample to said focal point of said collection lens.

2. The scanning microscope of claim 1, wherein said collection axis is substantially coincident with said axis of rotation.

3. The scanning microscope of claim 1, further comprising an aperture, disposed in image space of said collection lens and on said collection optical axis, for limiting the off-axis light that reaches the focal plane of said collection lens.

4. The scanning microscope of claim 3, further comprising a stage for holding a sample and a motor for selectively producing relative lateral movement between said stage and said collection axis.

5. The scanning microscope of claim 4, wherein said objective lens is an aspheric, aberration-corrected lens.

6. The scanning microscope of claim 1, wherein said objective lens is an aspheric, aberration-corrected lens.

7. The scanning microscope of claim 1, further comprising a stage for holding a sample and a positioning motor for selectively producing relative lateral movement between said stage and said collection axis.

8. The scanning microscope of claim 7, wherein said positioning motor is adapted to move said stage radially with respect to said collection axis.

9. The scanning microscope of claim 7, wherein said positioning motor is adapted to move said stage in two distinct lateral directions.

10. The scanning microscope of claim 1, further comprising a light source for emitting excitation light so as to be directed through said objective lens to a sample in object space of said objective lens to illuminate the sample.

11. The scanning microscope of claim 10, further comprising a beam splitter disposed between said objective lens, on the one hand, and said light source and collection lens, on the other hand, for propagating toward said objective lens excitation light from a first direction and propagating in a second direction toward said collection lens light emitted from a sample.

12. The scanning microscope of claim 11, wherein said beam splitter comprises a dichroic mirror.

13. The scanning microscope of claim 10, wherein said light source is a laser.

14. The scanning microscope of claim 10, further comprising an aperture, disposed in image space of said collection lens and on said collection optical axis, for limiting the off-axis light that reaches the focal plane of said collection lens.

15. The scanning microscope of claim 14, further comprising a stage for holding a sample and a positioning motor for selectively producing relative lateral movement between said stage and said collection axis.

16. The scanning microscope of claim 14, wherein said objective lens is an aspheric, aberration-corrected lens.

17. The scanning microscope of claim 10, wherein the diameter of light from said light source is substantially equal to the entrance pupil of said objective lens.

18. The scanning microscope of claim 10, further comprising a light-path-altering element, disposed between said objective lens and said light source, for translating light centered about said axis of rotation to light centered about said objective axis and vice-versa.

19. The scanning microscope of claim 18, wherein said light-path-altering element comprises a right-angle prism system coupled to said motor for rotation therewith.

20. The scanning microscope of claim 18, wherein said light-path-altering element comprises a wedge prism system coupled to said motor for rotation therewith.

21. The scanning microscope of claim 18, wherein said light-path-altering element comprises a plane parallel plate coupled to said motor for rotation therewith.

22. The scanning microscope of claim 1, wherein said motor comprises a center stator and an outer rotor, said rotor being mechanically coupled to said objective lens for rotation thereof, said microscope further comprising an optical element for altering the direction of light from said objective lens and vice-versa.

23. The scanning microscope of claim 1, wherein said objective lens has a first radius and said collection lens has a second radius, said offset being less than the sum of said first radius and said second radius.

24. A scanning microscope, comprising:
   a collection lens, having a collection optical axis, for receiving light in object space thereof and propagating it to a focal point on said collection optical axis in image space of said collection lens;
   an objective lens, disposed in object space of said collection lens and having an objective optical axis, for receiving light emitted from a sample in object space of said objective lens and propagating it to said collection lens;
   a light-path-altering element disposed between said objective lens and said collection lens for receiving light from an off-objective-optical-axis point in object space of said objective lens and directing it parallel to an axis of rotation offset from and extending in the same direction as said objective optical axis; and
   a motor, mechanically coupled to said light-path-altering element, for rotating said element around said axis of rotation.

25. The scanning microscope of claim 24, wherein said light-path-altering element comprises a pair of wedge prisms.

26. A method of scanning microscopy, comprising:
   providing a sample for microscopic examination;
   illuminating said sample;
   providing a collection lens having a collection optical axis;
   providing an objective lens having an objective optical axis;
   rotating said objective lens in one direction around an axis of rotation offset from and extending in substantially the same direction as said objective optical axis so as to produce a scanned image of said sample at the image-space focal point of said combination of said objective lens and said collection lens.

27. The method of claim 26, further comprising moving said sample laterally relative to said axis of rotation so as to scan a new portion of said sample with sequential rotation of said objective lens.

* * * * *